(12) United States Patent
Al-Kofahi

(10) Patent No.: US 12,674,769 B2
(45) Date of Patent: Jul. 7, 2026

(54) X-RAY SCANNING SYSTEM AND METHOD FOR INSPECTING AN OBJECT

(71) Applicant: Seethru AI Inc., Chelmsford, MA (US)

(72) Inventor: Omar Al-Kofahi, Chelmsford, MA (US)

(73) Assignee: SEETHRU AI INC., Chelmsford, MA (US)

( * ) Notice: Subject to any disclaimer, the term of this patent is extended or adjusted under 35 U.S.C. 154(b) by 0 days.

(21) Appl. No.: 18/822,070

(22) Filed: Aug. 30, 2024

(65) Prior Publication Data

US 2025/0146962 A1      May 8, 2025

Related U.S. Application Data

(63) Continuation of application No. 18/504,493, filed on Nov. 8, 2023, now Pat. No. 12,111,271.

(51) Int. Cl.
*G01N 23/203* (2006.01)
*G01N 23/20008* (2018.01)

(52) U.S. Cl.
CPC ... *G01N 23/20008* (2013.01); *G01N 2223/33* (2013.01)

(58) Field of Classification Search
None
See application file for complete search history.

(56) References Cited

U.S. PATENT DOCUMENTS

| | | | | |
|---|---|---|---|---|
| 6,459,761 B1* | 10/2002 | Grodzins | ............... | G01N 23/02 |
| | | | | 378/57 |
| 2005/0105665 A1* | 5/2005 | Grodzins | ............... | G01N 23/04 |
| | | | | 376/157 |
| 2009/0257555 A1* | 10/2009 | Chalmers | ............... | G01V 5/232 |
| | | | | 378/57 |
| 2010/0104069 A1* | 4/2010 | Mastronardi | ............ | G01V 5/22 |
| | | | | 378/86 |
| 2015/0327832 A1* | 11/2015 | Hu | ......................... | A61B 6/545 |
| | | | | 378/62 |
| 2016/0089104 A1* | 3/2016 | Naito | .................... | A61B 6/4417 |
| | | | | 600/449 |
| 2025/0100545 A1* | 3/2025 | Name | .................... | B60W 30/06 |

\* cited by examiner

*Primary Examiner* — Hoon K Song
(74) *Attorney, Agent, or Firm* — Witters & Associates; Steve Witters

(57) ABSTRACT

Presently disclosed is an x-ray scanning system and method for inspecting an object. The system has a first mobile x-ray scanner configured for scatter imaging and to generate a first compilation of scan data of a first side of the object. A second x-ray scanner is configured for imaging and generating a second compilation of scan data of a second side of the object. A movement device is configured and disposed to move at least one of the first scanner, the second scanner, and the object being scanned, during the scanning of the object. A data integrator is configured and disposed to receive and integrate the first compilation of scan data and the second compilation of scan data.

8 Claims, 10 Drawing Sheets

X-RAY SCANNING SYSTEM AND METHOD FOR INSPECTING AN OBJECT

CROSS REFERENCE TO RELATED APPLICATIONS

This application is a continuation of application Ser. No. 18/504,493, filed on Nov. 8, 2023, the entire content of which is herein incorporated by reference.

FIELD OF THE DISCLOSURE

The present disclosure relates to X-ray scanning systems and methods, in particular, to non-intrusive systems and methods for inspection of objects with x-rays.

BACKGROUND

Figure 1A:
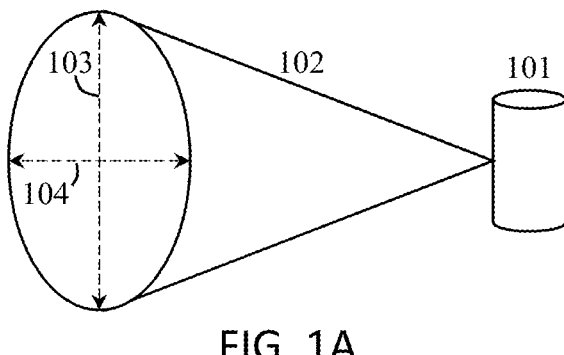
Figure 1B:
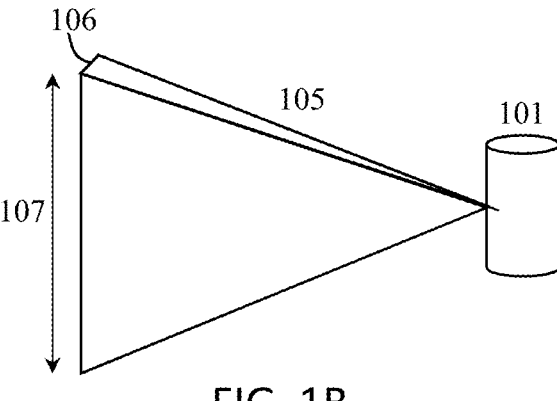
Figure 1C:
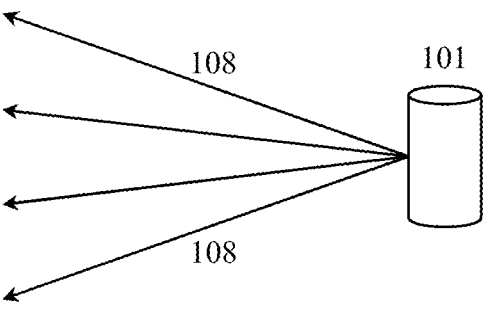

X-ray radiation is commonly used to perform non-intrusive inspection (NII) of objects. Examples include industrial, medical and security inspection. To perform imaging, an x-ray beam is typically formed into a cone beam, a fan beam, or a scanning pencil beam. FIG. 1A illustrates an x-ray source 101 emitting an x-ray beam formed in the shape of a cone 102 with a solid angle spanning more than 0.1 steradians and a cross-section that is typically elliptical or rectangular, and a length 103 to width 104 ratio close to 1.0. A fan beam, as illustrated in FIG. 1B, has a substantially planar shape 105 and a length 107 to width 106 ratio substantially greater than 1.0. A scanning pencil beam 108, as illustrated in FIG. 1C, is narrow, spanning a solid angle smaller than 0.02 steradians, and is moved to cover a substantially planner region.

Figure 2:
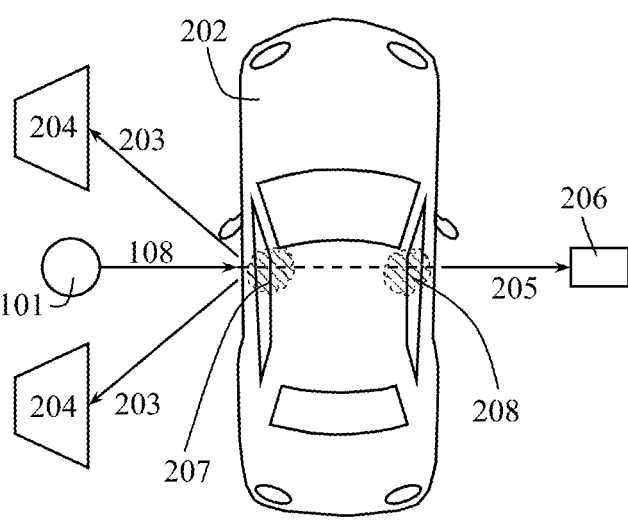

X-rays interact with inspected objects in two main processes, Compton scattering and Photoelectric Absorption. As illustrated in FIG. 2, x-ray scatter imaging is based on the Compton scattering process where an x-ray source 101 emits an x-ray beam which interacts with an inspected object 202 generating scattered x-rays 203, some of which are then captured by one or more scatter detectors 204. In contrast, x-ray transmission imaging is based on the Photoelectric Absorption process where an x-ray beam interacts with an inspected object 202 and the x-rays which penetrate through the object, along a straight line 205 without being absorbed, are captured by one or more x-ray transmission detectors 206 positioned on the opposite side of the inspected object relative to the x-ray source.

X-ray scatter imaging and x-ray transmission imaging reveal different properties of an inspected object. Changing the position of the x-ray source or detectors relative to the inspected object results in different views which may provide more information on the inspected object. Therefore, combining multiple x-ray images, scatter and/or transmission, acquired from multiple views may reveal more information about an inspected object.

It may be desired for x-ray scanning systems and methods to integrate two or more scanners by combining different imaging modalities or views which may increase the utility of x-ray inspection scanners.

SUMMARY

In one aspect of the present disclosure, an x-ray scanning system for inspecting an object is disclosed. The system has a first x-ray scanner comprising at least one x-ray beam source and at least one x-ray detector, the first x-ray scanner is configured and disposed to scan a first side of the object while at least one of the first x-ray scanner and the object is moving relative to the other and to generate a first compilation of scan data. A second x-ray scanner comprises at least one x-ray beam source and at least one x-ray detector, the second x-ray scanner is configured and disposed to scan a second side of the object while at least one of the second x-ray scanner and the object is moving relative to the other and to generate a second compilation of scan data. The second side of the object is different than the first side of the object and at least one of the first x-ray scanner and the second x-ray scanner is a mobile x-ray scanner configured and disposed for scatter imaging. A data integrator is configured and disposed to receive and integrate the first compilation of scan data and the second compilation of scan data and to output the integrated compilations of scan data. A controller is configured and disposed to control the first x-ray scanner and the second x-ray scanner.

In another aspect of the present disclosure, a method of x-ray scanning and inspecting an object is disclosed. The method comprises moving at least one of a first mobile x-ray scanner and the object being scanned, wherein the object or the first mobile x-ray scanner is moved relative to the other; scanning a first side of the object with the first mobile x-ray scanner, while the at least one of the first mobile x-ray scanner and the object are moving, and generating a first compilation of scanning data; moving at least one of a second x-ray scanner and the object being scanned, wherein the object or the second x-ray scanner is moved relative to the other; scanning a second side of the object with the second x-ray scanner, while the at least one of the second mobile x-ray scanner and the object are moving, and generating a second compilation of scanning data, wherein the second side of the object is different than the first side of the object; integrating the first compilation of scanning data with the second compilation of scanning data; and inspecting the integrated compilations of scanning data and thereby inspecting the scanned object.

In further aspect of the present disclosure, a data integrator configured and disposed to integrate a first compilation of scan data and a second compilation of scan data is provided. The data integrator has a data receiver configured to receive the first compilation of scan data and the second compilation of scan data. The first compilation of scan data comprises x-ray scatter imaging data of a first side of an object being scanned and is generated with a first mobile x-ray scanner having at least one x-ray beam source and at least one x-ray detector. The second compilation of scan data comprises x-ray imaging data of a second side of the object being scanned and is generated with a second x-ray scanner having at least one x-ray beam source and at least one x-ray detector. The data integrator is characterized by at least one of a)-c), wherein a)-c) are: a) the data integrator is configured to receive at least one of a first distance between the first x-ray scanner and the first side of the object being scanned and a second distance between the second x-ray scanner and the second side of object being scanned and to mitigate vertical scaling artifacts with the at least one received distance; b) the data integrator is configured to receive a speed between the object being scanned and at least one of the first x-ray scanner and the second x-ray scanner and to mitigate horizontal scaling artifacts with the received speed; and c) the data integrator is configured to resample at least one of a vertical dimension of the object being scanned and a horizontal dimension of the object being scanned, with at least one of the first scanner and the second scanner, the data integrator is configured to mitigate at least one of a vertical scaling artifact and a horizontal scaling artifact, with the at least one resample; and a data output port or device configured and disposed to send the integrated data to an inspection station for inspecting the scanned object.

BRIEF DESCRIPTIONS OF THE DRAWINGS

Figures 3A, 3B:
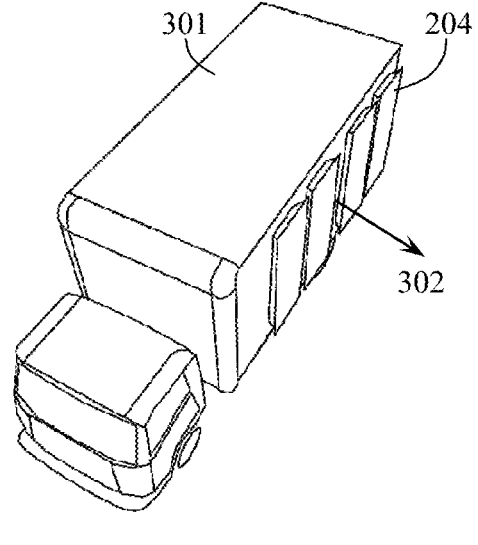
Figure 4:
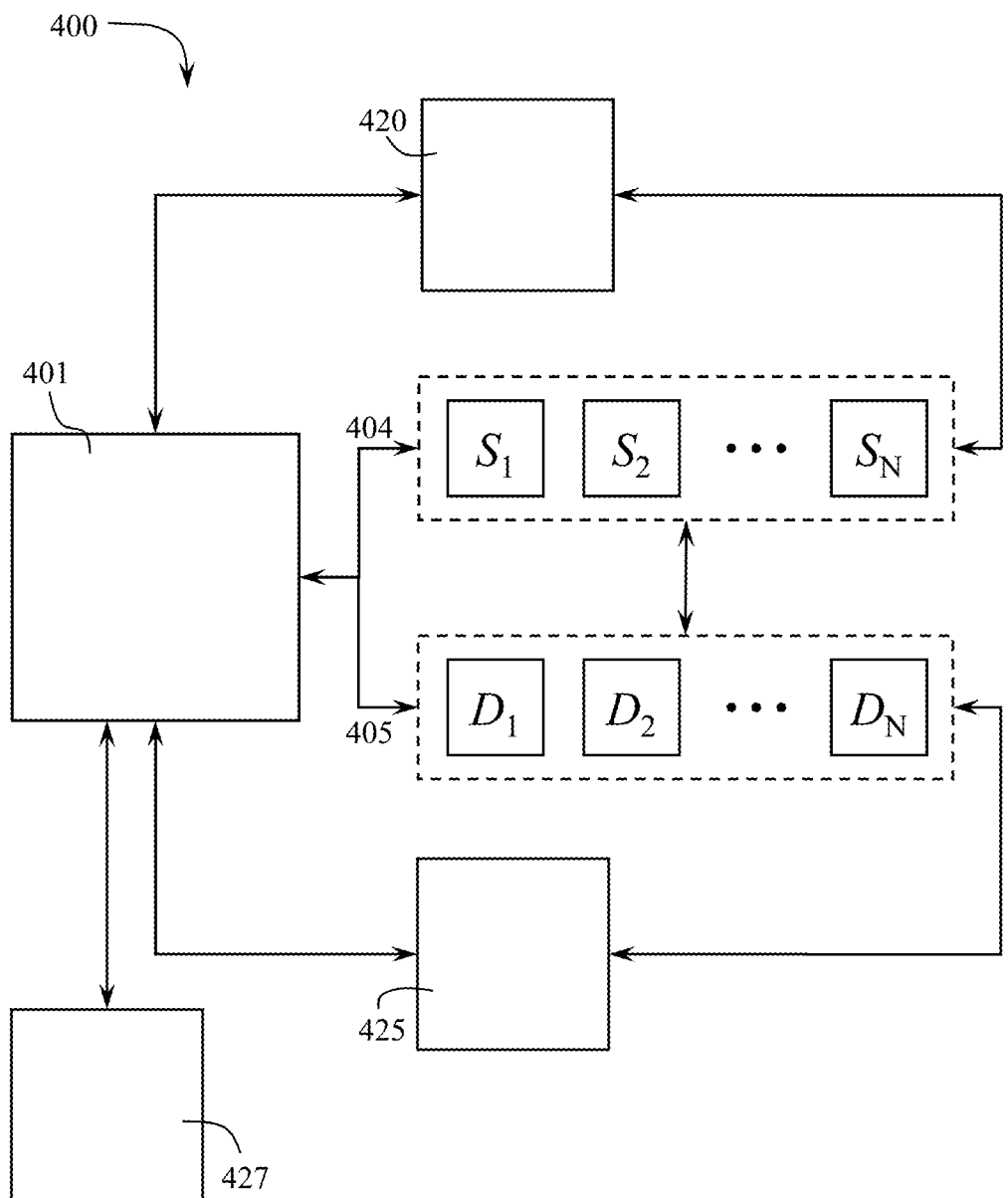
Figure 6:
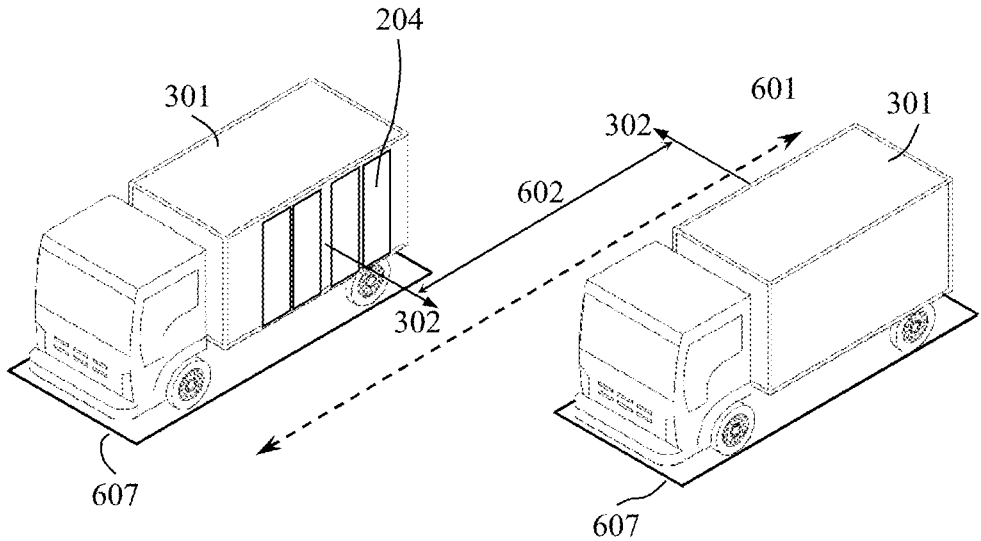
Figure 7:
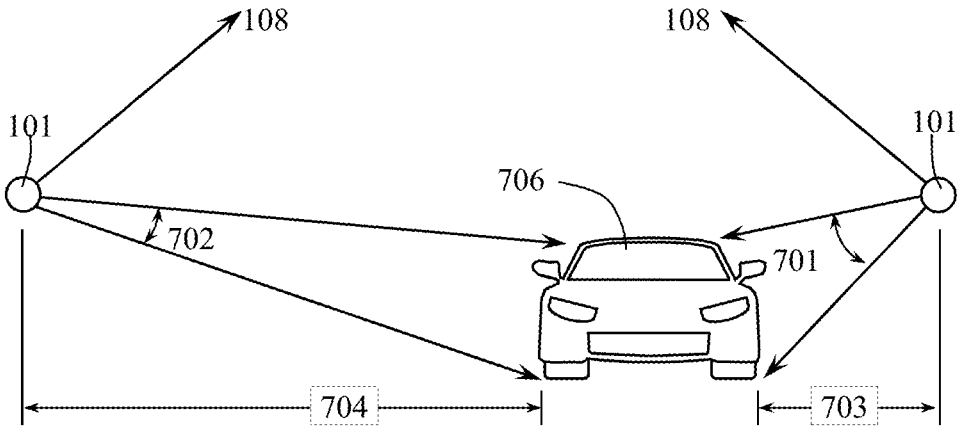
Figure 8:
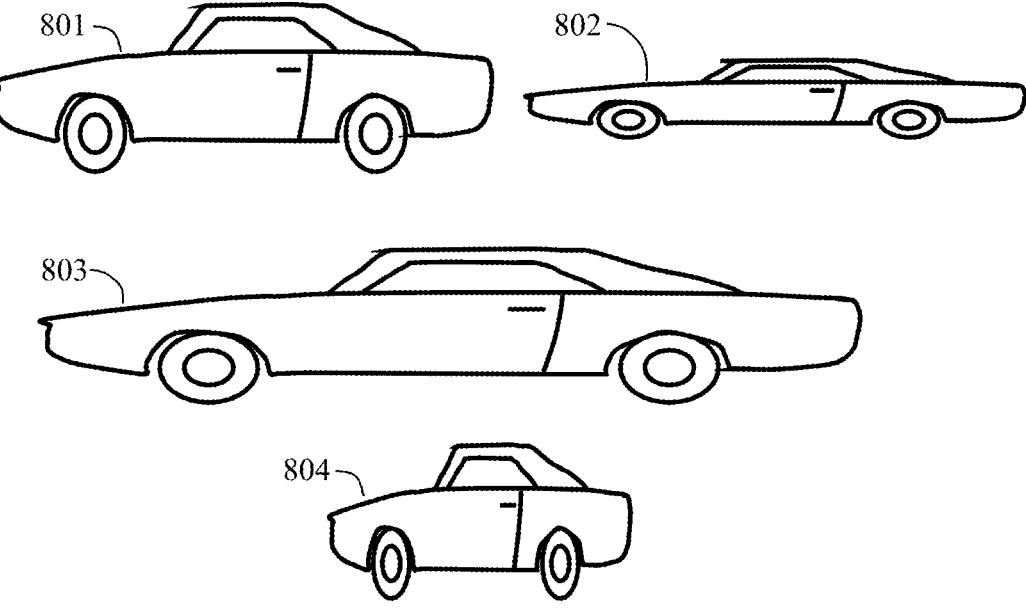
Figure 9:
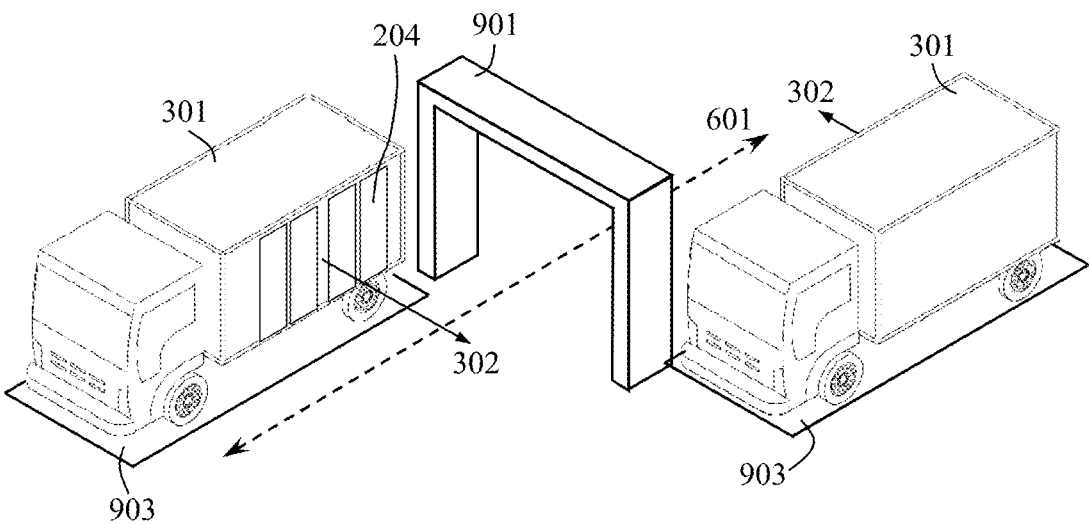
Figure 10:
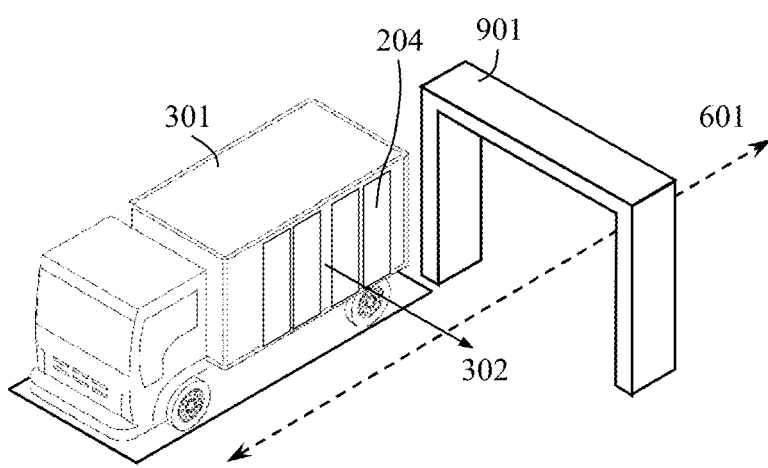

The foregoing and other features of this disclosure will become more fully apparent from the following description and appended claims, taken in conjunction with the accompanying drawings and examples. Understanding that these drawings depict only several embodiments in accordance with the disclosure and are, therefore, not to be considered limiting of its scope, the disclosure will be described with additional specificity and detail through use of the accompanying drawings, in which:

FIGS. 1A-1C illustratively show x-ray beam shapes emitted from an x-ray source;

FIG. 2 illustratively shows x-ray scatter and transmission imaging scanners;

FIGS. 3A and 3B illustratively show embodiments of mobile x-ray scanners configured for scatter imaging;

FIG. 4 schematically illustrates an x-ray scanning system of the present disclosure having a data integrator;

FIG. 5A-5D illustratively show examples of embodiments of fixed x-ray scanners;

FIG. 6 illustratively shows examples of the presently disclosed x-ray scanning system having a plurality of mobile x-ray scanners;

FIG. 7 illustratively shows a change in a size or field of view of an inspected object as a function of distance from x-ray source;

FIG. 8 illustratively shows vertical and horizontal image zoom artifacts resulting from varying scanning distances and speeds;

FIG. 9 illustratively shows examples of the presently disclosed x-ray scanning system having a plurality of mobile x-ray scanners and a fixed x-ray scanner; and FIG. 10 illustratively shows examples of the presently disclosed x-ray scanning system having a mobile x-ray scanner and a fixed x-ray scanner;

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Presently disclosed are systems and methods to integrate x-ray non-intrusive scanners or inspection imaging systems. The present disclosure provides methods to increase the utility of x-ray inspection scanners by integrating two or more such scanners to provide multiple x-ray images combining different imaging modalities or views. The presently disclosed system has at least two scanners, one of which is a mobile scanner. The scanners are disposed or positioned to acquire x-ray images from multiple angles or sides of the object being scanned. The multiple images from multiple scanners reveal different properties of a scanned object, providing more information for an operator or a computer software algorithm to find items of interest in inspected vehicles. Images and information from the presently disclosed integrated x-ray scanning system may be transferred to a master computer, an integrator, a controller, an inspection station, or database for image display, analysis, or storage. For example, an inspection station may be configured to receive an integrated compilation of data from a data integrator for the inspecting of the object.

Figures 5A, 5B, 5C, 5D:
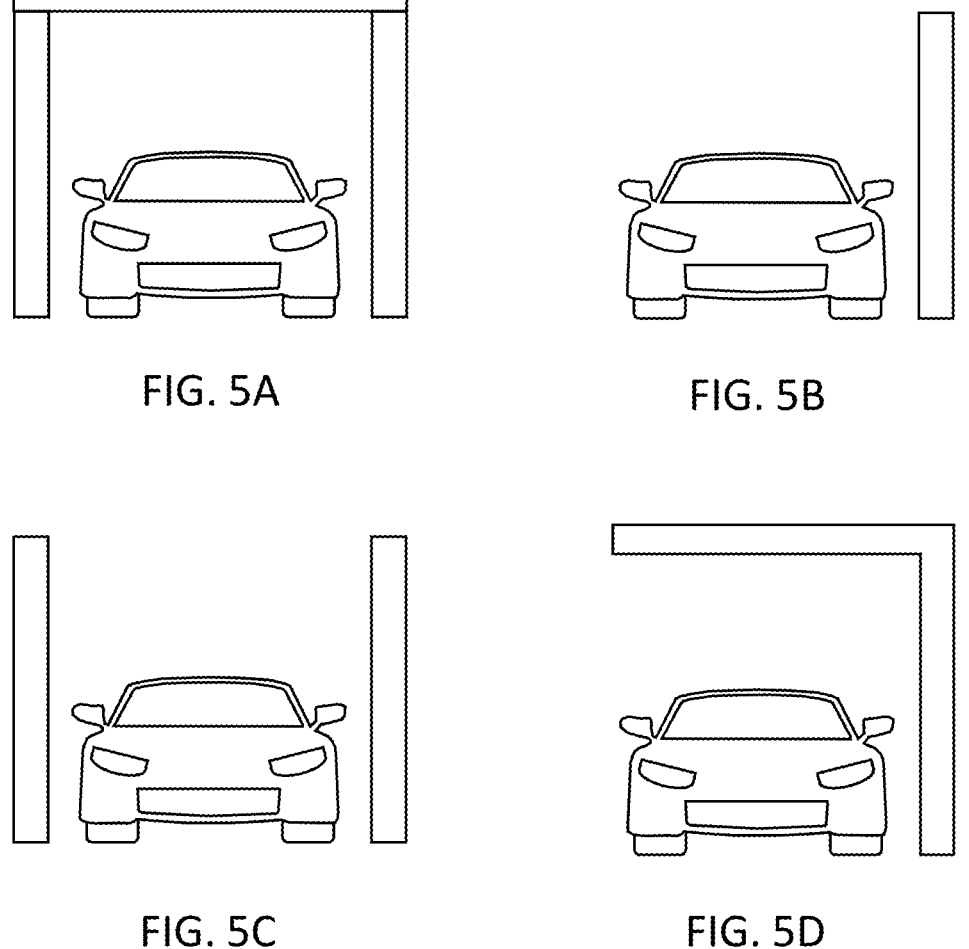

The presently disclosed x-ray scanning system has at least one mobile scanner integrated with at least one other scanner. For example, a mobile scanner may be integrated with one or more of two types of x-ray imaging systems or scanners, mobile scanners and fixed scanners. As illustrated in FIGS. 3A and 3B, a mobile x-ray scatter imaging system or scanner 301 comprises one or more x-ray sources, one of which, at least, is configured to emit a scanning pencil beam 302, and at least one scatter detector 204. Mobile scanner 301 may be mounted on a conveyance for movement with a movement device. For example, mobile scanner 301 may be disposed with a motorized vehicle or motorized cart, as illustrated in FIG. 3A, or on a non-motorized conveyance, such as trailer or push cart, as illustrated in FIG. 3B. A fixed x-ray imaging system or scanner, as illustrated in FIGS. 5A-5D, is not movable and has one or more x-ray sources, each configured to emit an x-ray pencil beam or fan beam, directed at an inspected object from the side, top, or bottom. A fixed x-ray imaging system or scanner may be configured in the form of a gate as illustrated in FIG. 5A, one or two substantially vertical structures as illustrated in FIG. 5B and FIG. 5C, respectively, or an L-shape structure as illustrated in FIG. 5D. A mobile x-ray scatter imaging system or scanner may be versatile and may not require x-ray transmission detectors 206 placed on the opposite side of objects being inspected, as is illustrated in FIG. 2.

The presently disclosed x-ray scanning system and method for inspecting an object integrates two or more x-ray imaging systems or scanners, at least one of which is a mobile x-ray scanner. The integration of imaging data from a plurality of scanners may provide for improvements in the inspecting of objects as the integration may reveal more information about inspected objects. Each of the x-ray scanners in the presently disclosed x-ray scanning system may also be configured to operate independently. Integrating the x-ray scanners may help mitigate or overcome the single-sided imaging limitation of mobile x-ray scatter imaging systems and provide benefits such as consolidated imaging records for scanned objects, fewer operators and image analysts, improved detection performance by human analysts as well as automated detection algorithms. For example, a sole inspector may be needed to inspect the objects being scanned.

As used herein and in any appended claims, the following terms shall be defined as follows:

"Cone beam" shall refer to a beam of x-rays formed into a cone 102 as illustrated in FIG. 1A, typically with an elliptical or rectangular cross-section, and a length 103 to width 104 ratio close to 1.0. A cone beam spans a solid angle larger than 0.1 steradians.

"Fan beam" shall refer to a beam of x-rays that is substantially planar 105 as illustrated in FIG. 1B, and a length 107 to width 106 ratio substantially greater than 1.0.

"Scanning pencil beam" shall refer to a narrow beam of x-rays 108 spanning a solid angle of less than 0.02 steradians. The pencil beam is moved in a substantially planar region as illustrated in FIG. 1C.

"Beam plane" shall refer to a substantially planar region subtended by a fan beam or a scanning pencil beam.

"Transmission detector" shall refer to an x-ray detector designed to detect x-ray photons from a scanning pencil beam or a fan beam which penetrate through an object along a substantially straight path. A transmission detector may comprise multiple channels, each preferentially sensitive to a different part of the incident x-ray spectrum.

"Scatter detector" shall refer to an x-ray detector designed to detect scattered x-ray photons resulting from the interaction of a scanning pencil beam with an object.

"Scatter imaging" shall refer to interrogating an object with a scanning pencil-beam and collecting the scattered x-ray radiation with one or more scatter detectors to form an image of the inspected object.

"Mobile x-ray scatter imaging system or scanner" shall refer to a system comprising one or more sources of x-rays one of which, at least, emitting a scanning pencil beam with peak energy greater or equal to 120 kV. The system further comprises control and data acquisition subsystems and one or more scatter detectors. The system is mounted on a movable conveyance such as a motorized vehicle, or a non-motorized conveyance such as a trailer or cart. Example embodiments of the system are illustrated in FIG. 2.

"Fixed x-ray imaging system or scanner" shall refer to a non-moving x-ray imaging system comprising one or more x-ray sources emitting one or more scanning pencil beams or fan beams with peak energies greater or equal to 120 kV, towards an inspected object in a substantially sideward, downward, or upward direction. The system also comprises at least one x-ray scatter detector, transmission detector, or both, mounted above, below or to the side of inspected objects. The system further comprises a computer system further comprises one or more data processors and memory. Example embodiments of the system are illustrated in FIG. 3. Controller configured and disposed to control the first x-ray scanner and the second x-ray scanner.

"X-ray scanner" or scanner shall broadly refer to an x-ray imaging system such as a fixed x-ray imaging system or a mobile x-ray imaging system.

FIGS. 1A-1C illustrates x-ray beam shapes emitted from an x-ray source 101. FIG. 1A shows cone beam 102, which typically has an elliptical or rectangular cross-section spanning a solid angle greater than 0.1 steradians and having a length 103 to width 104 ratio close to 1.0. FIG. 1B shows an x-ray fan beam 105, which is substantially planar with a length 107 to width 106 ratio substantially greater than 1.0. FIG. 1C shows an x-ray scanning pencil beam 108 which is moved in a substantially planner region and spanning a solid angle less than 0.02 steradians.

In imaging applications, an x-ray beam is typically formed into a cone beam, a fan beam, or a scanning pencil beam, as illustrated in FIGS. 1A-1C. A fan beam is typically formed by placing an x-ray collimator comprising two substantially parallel pieces of x-ray attenuating material, such as lead, in front of an x-ray source such that only a fan beam is allowed to exit the collimator. A scanning pencil beam is typically formed by placing an x-ray attenuating material, such as lead, in front of an x-ray fan beam, with one or more openings allowing a pencil beam to exit. The apparatus containing the attenuating material typically has openings formed into a disk, wheel, or cylinder which is then rotated to cause a pencil beam to scan in a substantially planner region. There are other methods to form a scanning pencil beam such as moving an electron beam over an anode (target) generating x-ray radiation which then passes through one or more collimator openings to form a scanning pencil beam. The presently disclosed x-ray scanning system may have x-ray scanners with one or more x-ray scanning pencil beams or fan beams, independent of the method used to create the scanning pencil beams or fan beams.

FIG. 2 illustratively shows x-ray scatter and transmission scanners or imaging systems. A top view illustrates an x-ray imaging system comprising an x-ray source 101 emitting an x-ray beam which interacts with an object 202, generating scattered x-rays 203, part of which are captured by one or more x-ray scatter detectors 204. The part of the x-ray beam which penetrates through the inspected object along a straight path without being absorbed 205 is captured by one or more transmission detectors 206.

As illustrated in FIG. 2, when an x-ray pencil beam 108 interacts with an inspected object 202, such as a vehicle, it results in scattered x-rays primarily due to the x-ray Compton effect when interacting with matter. Some of these x-rays scatter in the backward direction 203, towards the same side where the x-ray source is located, and hence referred to as backscatter. Part of the backscattered x-rays are then captured by one or more x-ray detectors 204 located on the same as the x-ray source relative to the inspected object. As known to a person skilled in the art, the deeper the pencil beam travels into the inspected object the more it is attenuated. Further, the resulting x-ray backscatter 203 must then travel a longer distance, and undergo more attenuation, before it reaches the one or more detectors 204. Finally, the solid angle for each detector relative to the point where scatter originates from is proportional to $1/R^2$, where R is the distance between a detector and the point where x-ray scatter originates from. Hence, x-ray backscatter imaging reveals additional or more information of the inspected object from the side closer to the x-ray source and one or more detectors compared to the far side. For example, an object 207 placed closer the near side of an object or inspected vehicle results in more x-rays captured in the one or more detectors 204 compared to an object 208 placed closer to the far side of an inspected vehicle.

An object may need to be inspected from multiple sides to overcome the x-ray backscatter near-sided imaging limitation. The presently disclosed x-ray scanning system discloses a data integrator system and methods which allow two x-ray inspection scanners, at least one of which is a mobile x-ray backscatter scanner, to operate in integrated mode or separately as standalone scanners, hence offering both operational flexibility and multi-sided imaging.

FIGS. 3A and 3B illustrate embodiments of mobile x-ray scatter imaging systems 301, each comprising one or more x-ray sources, one of which, at least, is configured to emit a scanning pencil beam 302, and one or more x-ray scatter detectors 204. FIG. 3A shows a scanner or system mounted on a motorized conveyance. FIG. 3B shows a scanner or system mounted on a non-motorized conveyance, such as a trailer or push cart. The one or more x-ray scatter detectors may be visible from outside the scanner body as illustrated in FIG. 3A or hidden as illustrated in FIG. 3B.

FIG. 4 illustratively shows x-ray scanning system 400 having a data integrator 401, integrating two or more scanners $S_1, S_2, \ldots S_N$, an inspection station 420, and a controller 425. X-ray scanning system 400 has data integrator 401 which receives and integrates data from two or more scanners, $S_1, S_2, \ldots S_N$, where at least one of which is a mobile x-ray backscatter system or scanner having at least one x-ray beam source and at least one x-ray detector. In at least one embodiment, x-ray scanning system 400 has a first x-ray scanner $S_1$ comprising at least one x-ray beam source and at least one x-ray detector, configured and disposed to scan a first side of an object while at least one of the first x-ray scanner and the object is moving relative to the other and to generate a first compilation of scan data. A second x-ray scanner $S_2$ has at least one x-ray beam source and at least one x-ray detector, second x-ray scanner $S_2$ is configured and disposed to scan a second side of the object while at least one of second x-ray scanner $S_2$ and the object is moving relative to the other and to generate a second compilation of scan data. The first side of the object is different than the second side of the object.

Data integrator 401 is configured and disposed to receive and integrate the first compilation of scan data and the second compilation of scan data. For example, x-ray scanning system 400 has one or more communication channels 404 configured and disposed for data integrator 401 to receive the compilations of scan data from scanners $S_n$. For example, data integrator 401 may be configured and disposed to receive data output from each scanner for integration. Communication channels 404 may be configured for two-way communication, sending and receiving data, between scanners $S_n$ and integrator 401. Channels 404 may be wired or wireless. The data or compilations of data may include, without limitation, x-ray images of inspected objects, system or scanner status, and control signals such as switching x-rays on or off and starting or stopping data acquisition. In at least one embodiment, images, annotations, and relevant information or data may be collected from all or part of the integrated imaging systems or system 400 and may be saved in database 427. For example, data gathered with each individually scanned object may be saved in a single or separate database record in database 427.

X-ray scanning system 400 may have one or more peripheral devices $D_1, D_2, \ldots D_N$. For example, data integrator 401 may also be connected to one or more peripheral devices $D_1, D_2, \ldots D_N$, which may provide information additional to the x-ray image data. Such peripheral devices may include, without limitation, sensors, speed measuring devices, distance measuring devices, cameras, license plate readers, and more. The peripheral devices may include sensors or devices configured to aid in the organization of the inspection operation, such as visual and audible alarms, traffic lights, and barrier gates and access control. The data integrator system may communicate with peripheral devices $D_1, D_2, \ldots D_N$ over a channel 405, which may be wired or wireless.

In at least one embodiment, x-ray scanning system 400 for inspecting an object has a first x-ray scanner $S_1$ comprising at least one x-ray beam source and at least one x-ray detector, scanner $S_1$ is configured and disposed to scan a first side of the object while at least one of the first x-ray scanner and the object is moving relative to the other and to generate a first compilation of scan data. A second x-ray scanner $S_2$ has at least one x-ray beam source and at least one x-ray detector, scanner $S_2$ is configured and disposed to scan a second side of the object while at least one of the second x-ray scanner and the object is moving relative to the other and to generate a second compilation of scan data. The second side of the object is different than the first side of the object and at least one of scanners $S_1$ and $S_2$ is a mobile x-ray scanner configured and disposed for scatter imaging. Data integrator 401 is configured and disposed to receive and integrate the first compilation of scan data and the second compilation of scan data. Controller 425 is configured and disposed to control scanners $S_1$ and $S_2$. Inspection station 420 is configured and disposed to receive the integrated compilations of data from data integrator 401 for the inspecting of the object.

Data integrator 401 and controller 425 may be a common device or separate devices. For example, one or more electronic devices may be configured to receive and integrate the compilations of data, control switching x-rays on or off, starting or stopping data acquisition, organization of the inspection operation, activating alarms, traffic lights, or barrier gates, and providing access control. Peripheral devices $D_1, D_2, \ldots D_N$ may be in communication with at least one of data integrator 401 and controller 425 and may aid in the control of the x-ray scanning system or in the integration of the data.

In at least one embodiment, inspection station 420 is configured to receive the integrated compilation of data from data integrator 401 for the inspecting of the object. Inspection station 420 may be configured to receive the integrated data from data integrator 401 and present the integrated data for the inspection of the object. For example, inspection station 420 may have one or more monitors for visually inspecting the object being scanned. In at least one embodiment, the integrated data is visually displayed on the same monitor or proximate monitors for viewing or inspecting by a single viewer or inspector at inspection station 420. For example, images of the first side of the scanned object and the second side of the scanned object may be displayed side by side in a parallel fashion for viewing and inspecting of the scanned object.

In at least one embodiment, data integrator 401 is disposed with a mobile x-ray scanner. In at least one other embodiment, controller 425 is disposed with the mobile x-ray scanner. In at least one additional embodiment, inspection station 420 is disposed with the mobile x-ray scanner. For example, a mobile x-ray scanner may have data integrator 401, controller 425, and inspection station 420. This embodiment of the presently disclosed x-ray scanning system may provide a mobile system that may integrate with an existing system such as an existing fixed scanner.

In at least one embodiment of the present disclosure, x-ray scanning system 400 for inspecting an object has a first mobile x-ray scanner $S_1$ configured and disposed for scatter imaging comprising at least one x-ray beam source 302 and at least one x-ray detector 204. First x-ray scanner $S_1$ is configured and disposed to scan a first side of the object while at least one of first x-ray scanner $S_1$ and the object is moving relative to the other and to generate a first compilation of scan data. A second x-ray scanner $S_2$ has at least one x-ray beam source and at least one x-ray detector, second x-ray scanner $S_2$ is configured and disposed to scan a second side of the object while at least one of second x-ray scanner $S_2$ and the object is moving relative to the other and to generate a second compilation of scan data. The second side of the object is different than the first side of the object. A movement device is configured and disposed to move at least one of first scanner $S_1$, second scanner $S_2$, and the object being scanned, during the scanning of the object. A data integrator 401 is configured and disposed to receive and integrate the first compilation of scan data and the second compilation of scan data and to output the integrated compilations of data. A controller 425 is configured and disposed to control first x-ray scanner $S_1$ and second x-ray scanner $S_2$.

Inspection station 420 is configured to receive the integrated compilations of data output from data integrator 401 for the inspecting of the object. Data integrator 401 may be disposed with first mobile x-ray scanner $S_1$. At least one of controller 425 and inspection station 420 may be disposed with first mobile x-ray scanner $S_1$. X-ray scanning system 400 may have at least one distance measuring device or sensor configured to obtain and report at least one of a first distance between the first scanner and the first side of the object being scanned and a second distance between the second scanner and the second side of the object being scanned. For example, X-ray scanning system 400 may have one or two distance measuring devices or sensors configured and disposed for gathering and reporting distance data for mitigating vertical scaling artifacts. In at least one embodiment, X-ray scanning system 400 may have a first distance measuring device or sensor $D_1$ configured to obtain and report a first distance 703 between first x-ray scanner $S_1$ and the first side of the object being scanned and a second distance measuring device or sensor $D_2$ configured to obtain and report a second distance 704 between second x-ray scanner $S_1$ and the object scanned. Data integrator 401 may be configured to receive at least one reported distance and to mitigate vertical scaling artifacts with the at least one reported distance.

X-ray scanning system 400 may have at least one speed measuring device or sensor $D_3$ configured to measure and report a speed between the object being scanned and at least one of first x-ray scanner $S_1$ and second x-ray scanner $S_2$ and data integrator 401 may be configured to mitigate horizontal scaling artifacts with the reported speed.

X-ray scanning system 400 may be configured to resample at least one of a vertical dimension of the object being scanned and a horizontal dimension of the object being scanned, with at least one of first scanner $S_1$ and second scanner $S_2$. Data integrator 400 may be configured to mitigate at least one of a vertical scaling artifact and a horizontal scaling artifact, with the at least one resample.

FIG. 5A-5D illustrates examples of embodiments of fixed x-ray scanners or imaging systems scanning an object such as an automobile. Each scanner has at least one x-ray source emitting a scanning pencil beam or a fan beam, and at least one x-ray scatter detector or transmission detector. Fixed x-ray scanners are typically configured as a gate, as illustrated in FIG. 5A. Alternative embodiments comprise one or two substantially vertical structures as shown in FIGS. 5B and 5C, respectively, or an L-shaped structure as in FIG. 5D.

FIG. 6 illustrates an embodiment of the presently disclosed x-ray scanning system. An inspected object, such as a vehicle, passes through an inspection area along a scanning direction 601. In at least one embodiment of the x-ray system of the present disclosure, an integrated inspection system comprises two mobile x-ray scatter imaging systems or scanners 301, each emitting a scanning pencil beam 302 towards the inspected object, where the x-ray beam planes are separated by a distance 602. For example, at least one of the first x-ray scanner and the second x-ray scanner 301 may be a mobile x-ray scanner configured and disposed for scatter imaging. Demarcations 607 may be placed in the scanner area to indicate disposition, or placement, of one or more scanners. For example, demarcations 607 may be placed to mitigate crosstalk between the scanners, provide desired angles for scanning, or to mitigate a dose or x-rays to persons in the area. In at least one embodiment, one or more positions are selected for placement of a mobile x-ray scanner and demarcated on the surface. The position may be selected based upon at least one of mitigating crosstalk, providing a desired side or angle of the object for scanning, providing for a desired movement path of the object being scanned, such as a linear path for example, and providing an exclusion zone.

At least one embodiment of the presently disclosed x-ray scanning system is illustrated in FIG. 6, wherein two mobile x-ray scatter imaging systems or scanners 301 are integrated. To inspect an object, such as a vehicle, the object passes through the respective x-ray beams of scanners 301. This can be achieved by fixing the position of the two scanners 301 while the inspected object moves along an inspection path 601. Alternatively, both scanners 301 may move relative to a stationary object being scanned, or both scanners 301 and the object being inspected may simultaneously move such that the relative speed between the imaging systems and inspected object is greater than zero. The movement of the object being scanned or the mobile x-ray scanners 301 may cause imaging artifacts. The presently disclosed system or integrator provides for mitigating the scaling artifacts.

Imaging artifacts may be caused by crosstalk between multiple x-ray imaging systems or scanners, which occurs when detectors of the respective systems receive scattered x-rays originating from multiple scanners but are unable to determine which x-ray source is the origin of the detected scattered x-rays. As known to a person skilled in the art, crosstalk between pencil beam scanners is inversely proportional to the distance 602 between the respective x-ray beam planes. For example, crosstalk between two mobile x-ray scatter imaging systems 301 is inversely proportional to the distance 602 between the respective x-ray beam planes.

There are multiple techniques to mitigate crosstalk between integrated scanners as disclosed herein. One example method may be to separate the x-ray beam planes of the respective pencil beam imaging systems by some distance. The optimal separation distance depends on a number of factors, including without limitation, the respective x-ray energies of the integrated x-ray systems; the solid angle of the pencil beams used; and detector and electronics speed and response time. In at least one embodiment of the presently disclosed x-ray scanning system, an area or space, 607 or 903, is designated for the placement of the mobile scanner of the present disclosure to mitigate crosstalk between the integrated scanners. For example, distance 602 may be between about 10 feet and 25 feet, or about 15 feet, wherein the x-ray scanning system has at least one mobile x-ray scanning pencil beam scatter imaging systems or scanners 301.

One alternative method to mitigate the crosstalk between two x-ray mobile scatter imaging systems is to apply time-multiplexing on the respective pencil beams such that only one pencil beam is active at any given time. The means to apply time-multiplexing varies based on the how the respective pencil beams are created. For example, if the scanning pencil beams are created by means of a rotating disk or wheel, then the multiplexing is achieved by a control system which locks the phase between respective rotating disks or wheels such that only one scanning pencil beam is emitted at any time. In at least one embodiment of the present disclosure, controller 425 is configured to control the integrated scanners and apply time-multiplexing on the pencil beams and mitigate crosstalk.

FIG. 7 illustrates the change in field of view covering an inspected object 706 as a function of distance from x-ray source. Another imaging artifact stems from the varying distance between the scanned object and the respective x-ray mobile scatter imaging systems or scanners. When an object, such as a vehicle, is inspected by two or more scanners, at least one of which may be a mobile x-ray scatter scanner, from different or opposite sides, the angular field of view covered by the inspected object is inversely proportional to the distance from the x-ray source. Hence, as illustrated in FIG. 7, the angular field of view 701 covering an object 706 at distance 703 from an x-ray source 101 is larger than the angular field of view 702 from x-ray source 102 covering the same object 706 at a greater distance 704. As a result of this distance dependent angular field of view, a scanned object scanned by two mobile x-ray scatter imaging systems emitting x-rays from opposite directions as illustrated in FIG. 6 may appear shorter in the vertical dimension in one view relative to the other view, as illustrated in FIGS. 8, 801 and 802, respectively.

The imaging artifact resulting from varying scanning distance from different or opposite directions may be corrected or mitigated by means of resampling one or both images from respective scanners along the vertical dimension so that a scanned object appears to have the same height from both sides. The resampling zoom factor can be calculated from the respective images directly. For example, a human operator may select two regions corresponding to the scanned object from the different sides where the vertical zoom factor is equal to the height ratio of the selected regions. In other applications, one or more distance measurement devices, including without limitation, a laser range finder or stereo camera, may be used to calculate distances 703 and 704 between the scanned object and the two mobile x-ray scatter imaging systems, and the vertical zoom factor is calculated based on the ratio of the distances.

FIG. 8 shows vertical and horizontal image zoom artifacts resulting from varying scanning distance and speed. While the distance between the scanned object and the two mobile x-ray scatter imaging systems causes vertical image artifacts as disclosed above, variations in relative scanning speed between the scanned object and the two scanning systems may cause horizontal image artifacts where the scanned object appears shorter along the horizontal dimension in one scanner image with respect to the other scanner image, as illustrated in FIGS. 8, 803 and 804, respectively. Similar to the vertical image artifacts presented above, the horizontal imaging artifacts may be corrected by means of resampling one or both images from respective scanners along the horizontal dimension so that a scanned object appears to have the same length from both sides. The resampling zoom factor may be calculated from the respective images directly. For example, a human operator can select two regions corresponding to the scanned object from opposite sides where the horizontal zoom factor is equal to the length ratio of the selected regions. In other applications, a distance measurement device, including without limitation, a Radar, a or a sequence of laser range finder or stereo camera measurements, may be used to calculate the relative scanning speed between the scanned object and the two mobile x-ray scatter imaging systems, and the horizontal zoom factor is calculated based on the ratio of the speeds.

In at least one embodiment of the present disclosure, the x-ray system is configured to mitigate horizontal imaging artifacts with resampling. For example, the distance 602 between the x-ray beam planes of the respective x-ray imaging systems results in a time-offset between when the images, from each imaging system, are captured. An x-ray scatter imaging system is a line scanner which scans an inspected object one line or plane at a time. The line scanning rate, measured by how many lines are scanned in a second, is known from the speed at which a scanning pencil beam completes a scan of the field of view. For example, if a pencil beam scans the field of view in 5 ms, then the sampling rate of the corresponding scanning system is 200 lines/s (Hz). Knowing the line scanning rate for the respective imaging systems and the distance 602 between the respective beam planes, the time-offset can be calculated. With the time-offset and line scanning rates of the respective scanners, one can calculate the horizontal image offset between the location of the scanned object in images of respective scanners and mitigate the horizontal imaging artifacts.

In at least one embodiment of the present disclosure, the x-ray scanning system is configured to mitigate vertical scaling artifacts. In at least one embodiment, X-ray scanning system 400 has at least one distance measuring device or sensor configured to obtain and report at least one of a first distance between the first scanner and the first side of the object being scanned and a second distance between the second scanner and the second side of the object being scanned and is configured to mitigate vertical scaling artifacts with the at least one reported distance. For example, $D_1$ may have a first distance measuring device or sensor configured to obtain and report a first distance between the first x-ray scanner and the first side of the object being scanned. $D_2$ may have a second distance measuring device or sensor configured to obtain and report a second distance between the second x-ray scanner and the object scanned. Data integrator 401 may be configured to receive at least one reported distance and to mitigate vertical scaling artifacts with the at least one reported distance.

In at least one other embodiment of the present disclosure, the x-ray scanning system is configured to mitigate horizontal scaling artifacts. For example, $D_n$ may have at least one speed measuring device or sensor configured to measure and report a speed between the object being scanned and at least one of the first x-ray scanner and the second x-ray scanner. Data integrator 401 may be configured to receive the reported speed and mitigate horizontal scaling artifacts with the reported speed.

In at least one further embodiment of the present disclosure, the x-ray scanning system is configured to mitigate one or both of horizontal and vertical scaling artifacts with resampling. For example, the x-ray scanning system may be configured to resample at least one of a vertical dimension of the object being scanned and a horizontal dimension of the object being scanned, with at least one of the first scanner and the second scanner. Data integrator 401 may be configured to mitigate at least one of a vertical scaling artifact and a horizontal scaling artifact, with the at least one resample.

FIG. 9 illustrates an alternative embodiment of the presently disclosed x-ray scanning system. FIG. 9 shows an inspected object, such as a vehicle, passes through an inspection path 601 within an integrated inspection system comprising two mobile x-ray scatter imaging systems or scanners 301 and one fixed x-ray imaging system or scanner 901. The plurality of x-ray images generated by the two mobile x-ray scatter imaging systems and the fixed imaging system provide more information on the inspected object compared to each system operating in standalone mode. For example, each of the scanners 301 may communicate scan or image data to the integrator and the integrator may then communicate the integrated data to an inspection station. The integrated data may be presented at an inspection station for inspection of the object. Demarcations 903 may be placed in the scanner area to indicate disposition, selected position, or placement, of one or more scanners, which may be placed to mitigate crosstalk between the scanners, provide a desired movement path of the object being scanned, or to mitigate a dose or x-rays to persons in the area. In at least one embodiment, two, or more scanners are placed in a parallel orientation for providing a linear inspection path

601. For example, two, three, four, or more scanners, at least one of which is mobile, may be placed in a parallel orientation.

FIG. 10 shows another embodiment of the presently disclosed x-ray scanning system having a fixed and a mobile scanner. The scanners are disposed such that an inspected object, such as a vehicle, passes through an inspection area along a scanning direction 601. The integrated inspection system comprises one mobile x-ray scatter imaging system or scanner 301 and one fixed x-ray imaging system or scanner 901. The integration of the two imaging systems provides more information on the inspected object compared to the imaging systems operating in standalone mode. In at least one embodiment, each of the scanners 301 and 901 may communicate scan or image data to the integrator and the integrator may then communicate the integrated data to an inspection station. The integrated data may be presented at an inspection station for inspection of the object by a sole inspector or operator. Demarcations 903 may be placed to mitigate crosstalk between the scanners, provide desired angles for scanning, or to mitigate a dose or x-rays to persons in the area. In at least one embodiment, one or more positions are demarcated for placement of a mobile x-ray for mitigating crosstalk between scanners, providing a desired side or angle of the object for scanning, or providing an exclusion zone.

Each of the mobile x-ray scatter imaging systems and fixed x-ray imaging systems used in various embodiments of the presently disclosed x-ray scanning system use one or more x-ray scatter detectors, one or more transmission detectors, or both scatter and transmission detectors. In at least one embodiment of the presently disclosed x-ray scanning system, the data integrator is disposed with the at least one mobile x-ray scanner. In at least one other embodiment of the presently disclosed x-ray scanning system, at least one of the controller and the inspection station is disposed with the at least one mobile x-ray scanner.

In embodiments of the presently disclosed x-ray scanning system comprising one or more mobile x-ray scatter imaging systems, the integrated inspection system may comprise optional alignment tools to facilitate alignment of the one or more mobile x-ray scatter imaging systems relative to each other or to a fixed x-ray imaging system. The alignment tools include distance and angle measuring tools, such as laser distance and angle finders, tape measures, rulers, protractors, and other tools known to a person skilled in the field. Alignment of the one or more mobile x-ray scatter imaging systems includes adjusting the distance between each the mobile system 301 and the scanned objects, the distance between the beam planes of all integrated imaging systems, and the angles between the beam planes. In embodiments where one or more mobile x-ray scatter imaging systems are to be integrated multiple times at the same location, optional markings may be applied to a ground surface to simplify the alignment process. The markings include labels on the ground to facilitate repositioning a mobile x-ray scatter imaging system at approximately the same location.

In embodiments of the presently disclosed x-ray scanning system, each of the integrated mobile x-ray scatter imaging systems or scanners and fixed x-ray imaging systems or scanners may be configured to operate in either integrated mode or standalone mode. When operating in integrated mode, image data acquired from each imaging system can be transferred to an integrator for integration and then to an inspection station for inspection of the object. For example, a master computer may be configured for integration of the data and for display and analysis of the integrated data.

Images, annotations, and relevant information for the same object collected from all or part of the integrated imaging systems may be saved in a single database record. Further, some or all of the control functions for each imaging system may also be performed from a master control system or controller, including switching x-rays on/off, starting and stopping data acquisition, checking status and errors, and correcting faults. Data and control signals and messages can be transmitted between each imaging system and the master computer and controller system over a wired or wireless connection. In some embodiments of the presently disclosed x-ray scanning system, the computer used to perform image display and analysis functions for any of the mobile or fixed imaging systems may be configured to be the master computer of the integrated system. In other embodiments, a separate computer, other than those used in any of the mobile or fixed imaging systems, is used as the master computer. For example, the controller and the integrator may be separate or common devices.

The presently disclosed x-ray scanning system, may comprise additional devices to augment the x-ray imaging data and improve the operations. These devices include, and are not limited to, vehicle license plate readers, container identification code readers, visible light cameras, under vehicle cameras, speed bumps, traffic gates and signs, and speed measurement devices such as radars. In applications where it is needed to track the total dose delivered to scanned objects, such as scanning vehicles with people inside them, dose information from each imaging system may also be transmitted to a master computer system to track the total dose delivered.

Presently disclosed is a method of x-ray scanning and inspecting an object. The method comprises moving at least one of a first mobile x-ray scanner and the object being scanned, wherein the object or the first mobile x-ray scanner is moved relative to the other. A first side of the object is scanned with the first mobile x-ray scanner, while the at least one of the first mobile x-ray scanner and the object are moving and a first compilation of scanning data is generated. At least one of a second x-ray scanner and the object being scanned are moved, wherein the object or the second x-ray scanner is moved relative to the other. A second side of the object is scanned with the second mobile x-ray scanner, while the at least one of the second mobile x-ray scanner and the object are moving and a second compilation of scanning data is generated. The second side of the object is different than the first side of the object. The first compilation of scanning data is integrated with the second compilation of scanning data and the compilation of scanning data is inspected and thereby the scanned object is inspected.

The step of integrating may be performed with the first mobile x-ray scanner. The step of inspecting may be performed with the first mobile x-ray scanner. The method may also comprise measuring or sensing at least one of a first distance between the first mobile x-ray scanner and the first side of the object being scanned and a second distance between the second x-ray scanner and the second side of the object being scanned. For example, the method may comprise measuring or sensing a first distance between the first mobile x-ray scanner and the first side of the object being scanned and/or measuring or sensing a second distance between the second x-ray scanner and the second side of the object being scanned. Vertical scaling artifacts may then be mitigated with the measured or sensed distance(s).

The method may comprise measuring or sensing a speed between the object being inspected and at least one of the first mobile x-ray scanner and the second x-ray scanner and mitigating horizontal scaling artifacts with the measured or sensed speed. The method may also comprise resampling at least one of a vertical dimension of the object being scanned and a horizontal dimension of the object being scanned, with at least one of the first mobile x-ray scanner and the second x-ray scanner and mitigating at least one of a vertical scaling artifact and a horizontal scaling artifact, with the at least one resample.

The method may comprise selecting a position for the first mobile x-ray scanner relative to the second x-ray scanner and moving the first mobile x-ray scanner into the selected position. The selecting of the position of the first mobile x-ray scanner may be based upon at least one of minimizing or mitigating crosstalk, providing a desired side or angle of the object for scanning, providing a desired movement path of the object being scanned, and providing an exclusion zone. For example, the selected position of the first mobile x-ray scanner may provide for a linear movement path of the object being scanned.

In at least one embodiment, the inspecting the integrated compilations of scanning data comprise displaying the integrated compilations of scanning data on the same or proximate screens for viewing by a single viewer or inspector. In at least one other embodiment, the method comprises moving at least one of a third x-ray scanner and the object being scanned, wherein the object or the third x-ray scanner is moved relative to the other, generating a third compilation of scanning data, and integrating the third compilation of scanning data with the first and the second compilations of scanning data.

The disclosed embodiments are illustrative, not restrictive, and the present invention can be used in applications beyond those in the embodiments disclosed herein. The present invention is not limited or restricted to the examples and drawings presented herein. The present disclosure is not to be limited in terms of the particular examples or embodiments described in this application, which are intended as illustrations of various aspects. Many modifications and variations can be made without departing from its spirit and scope, as will be apparent to those skilled in the art. Functionally equivalent materials, equipment, methods, and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method of x-ray scanning and inspecting at least one object, the method comprising:
   selecting a first position on a surface in a first scan area for a first mobile backscatter imaging x-ray scanner;
   wherein the first mobile backscatter imaging x-ray scanner has a first x-ray beam source and a first x-ray detector and is configured for backscatter imaging;
   rotating wheels and moving the first mobile backscatter imaging x-ray scanner on the surface of the first scan area to the first selected position, with a movable conveyance;
   performing a first scan of at least a first side of a first object with the first mobile backscatter imaging x-ray scanner, while at least one of the first mobile backscatter imaging x-ray scanner and the first object are moving, and generating a first compilation of scanning data;
   selecting a second position on a surface in a second scan area for the first mobile backscatter imaging x-ray scanner;
   rotating wheels and moving the first mobile backscatter imaging x-ray scanner on the surface of the second scan area to the second selected position, with a movable conveyance;
   performing a second scan of at least a first side of a second object with the first mobile backscatter imaging x-ray scanner, while at least one of the first mobile backscatter imaging x-ray scanner and the second object are moving, and generating a second compilation of scanning data;
   wherein the first object and the second object may be the same object or different objects, the first and the second scan areas may be the same or different, and the first and the second selected positions are different;
   transmitting the second compilation of scanning data to an inspection station;
   moving at least one of a second x-ray scanner and the second object being scanned, wherein the second object being scanned or the second x-ray scanner is moved relative to the other;
   wherein the second x-ray scanner is separate and distinct from the first mobile backscatter imaging x-ray scanner and has a second x-ray beam source and a second x-ray detector;
   performing a third scan of at least a second side of the second object with the second x-ray scanner, while the at least one of the second x-ray scanner and the second object being scanned are moving, and generating a third compilation of scanning data, wherein the second side of the second object being scanned is different than the first side of the second object being scanned;
   wherein the second compilation of scanning data and the third compilation of scanning data are separate and distinct scan data sets;
   transmitting the third compilation of scanning data to the inspection station;

integrating the second compilation of scanning data with the third compilation of scanning data, at the inspection station; and wherein the selecting of the second position of the first mobile x-ray scanner for the second scan and the moving of the at least one of the second x-ray scanner and the second object being scanned for the third scan are based upon mitigating crosstalk between the first x-ray beam source and the second x-ray detector and between the second x-ray beam source and the first x-ray detector, or to provide for a linear movement path of the object being scanned.

2. The method of claim 1, further comprising inspecting the integrated compilation of the first and the second scanning data, at the inspection station, upon the integrating of the first compilation of scanning data with the second compilation of scanning data, and thereby inspecting the scanned object.

3. The method of claim 1, further comprising:

moving at least one of a third scanner and the object being scanned, and scanning the object while the at least one of the third x-ray scanner and the object are moving, and generating a third compilation of scanning data;

transmitting the third compilation of scanning data to the inspection station; and integrating the third compilation of scanning data with the first and the second compilations of scanning data.

4. The method of claim 3, further comprising inspecting the integrated compilations of the scanning data, at the inspection station, and thereby inspecting the object.

5. The method of claim 2, wherein the step of inspecting the integrated compilations of scanning data is performed with the first mobile backscatter imaging x-ray scanner.

6. The method of claim 2, wherein the inspecting the integrated compilations of scanning data comprises displaying the integrated compilations of scanning data on the same or proximate screens for viewing by a single viewer or inspector.

7. The method of x-ray scanning and inspecting an object of claim 1, wherein the selecting of the first position of the first mobile backscatter imaging x-ray scanner is selected to provide for the linear movement path of the object being scanned.

8. The method of claim 1, further comprising at least one of a) and b), wherein a) and b) are:

a) measuring or sensing at least one of a first distance between the first mobile x-ray scanner and the first side of the object being scanned and a second distance between the second x-ray scanner and the second side of the object being scanned; and mitigating vertical scaling artifacts with the at least one measured or sensed distance; and b) resampling at least one of a vertical dimension of the object being scanned and a horizontal dimension of the object being scanned, with at least one of the first mobile x-ray scanner and the second x-ray scanner; and mitigating at least one of a vertical scaling artifact and a horizontal scaling artifact, with the at least one resample.

* * * * *